United States Patent
Birani et al.

(10) Patent No.: US 12,198,115 B2
(45) Date of Patent: Jan. 14, 2025

(54) SYSTEM AND COMPUTER-IMPLEMENTED METHOD FOR CHARACTER RECOGNITION IN PAYMENT CARD

(71) Applicant: Visa International Service Association, San Francisco, CA (US)

(72) Inventors: Bhanu Prakash Birani, Rajasthan (IN); Harsh Paliwal, Maharashtra (IN); Sahadev Pai, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/792,882

(22) PCT Filed: Jan. 16, 2020

(86) PCT No.: PCT/US2020/013783
§ 371 (c)(1),
(2) Date: Jul. 14, 2022

(87) PCT Pub. No.: WO2021/145876
PCT Pub. Date: Jul. 22, 2021

(65) Prior Publication Data
US 2023/0049395 A1   Feb. 16, 2023

(51) Int. Cl.
*G06Q 20/12* (2012.01)
*G06Q 20/32* (2012.01)
(Continued)

(52) U.S. Cl.
CPC ......... *G06Q 20/12* (2013.01); *G06Q 20/3223* (2013.01); *G06Q 20/353* (2013.01);
(Continued)

(58) Field of Classification Search
CPC .. G06Q 20/12; G06Q 20/353; G06Q 20/3223; G06Q 20/351; G06Q 40/02;
(Continued)

(56) References Cited

U.S. PATENT DOCUMENTS

2007/0031035 A1* 2/2007 Hovden ............... G06T 7/40
                                                        382/190
2008/0008376 A1* 1/2008 Andel ............... G06V 10/22
                                                        382/141
(Continued)

FOREIGN PATENT DOCUMENTS

| EP | 0017090 A1 * | 10/1980 | ............... G06K 9/32 |
| GB | 2518629 A | 4/2015 | |
| WO | 2018101985 A1 | 6/2018 | |

OTHER PUBLICATIONS

Datta, "Credit Card Processing Using Cell Phone Images", 2011, pp. 1-7.
(Continued)

*Primary Examiner* — Siamak Harandi
*Assistant Examiner* — Daniella M. DiGuglielmo
(74) *Attorney, Agent, or Firm* — The Webb Law Firm

(57) ABSTRACT

The present disclosure relates to a system and computer-implemented method for character recognition in a payment card. The method includes receiving an image of a payment card and one or more details associated with the payment card. Further, a derivative of the image is determined based on the one or more details and a horizontal sum of pixel values is determined for a plurality of rows in the image. Furthermore, one or more Regions of Interest (ROIs) are identified in the image by comparing the horizontal sum of pixel values with a predefined first threshold. Subsequently, one or more characters in the one or more ROIs are extracted using one or more peak values in a histogram of the one or more ROIs. Finally, each of the one or more characters extracted from the one or more ROIs is recognized using a trained Artificial Intelligence technique.

20 Claims, 11 Drawing Sheets

(51) Int. Cl.
    *G06Q 20/34*     (2012.01)
    *G06V 20/62*     (2022.01)
    *G06V 30/10*     (2022.01)
    *G06V 30/146*     (2022.01)
    *G06V 30/148*     (2022.01)
    *G06V 30/18*     (2022.01)
    *G06V 30/186*     (2022.01)
    *G06V 30/19*     (2022.01)

(52) U.S. Cl.
    CPC ............ *G06V 20/62* (2022.01); *G06V 30/147* (2022.01); *G06V 30/148* (2022.01); *G06V 30/18057* (2022.01); *G06V 30/18095* (2022.01); *G06V 30/186* (2022.01); *G06V 30/19147* (2022.01); *G06Q 20/351* (2013.01); *G06V 30/10* (2022.01)

(58) Field of Classification Search
    CPC .... G06V 20/62; G06V 30/147; G06V 30/148; G06V 30/18057; G06V 30/18095; G06V 30/186; G06V 30/19147; G06V 30/10
    See application file for complete search history.

(56) References Cited

U.S. PATENT DOCUMENTS

| | | | |
|---|---|---|---|
| 2015/0347859 A1* | 12/2015 | Dixon | G06V 30/2253 |
| | | | 382/138 |
| 2015/0347860 A1 | 12/2015 | Meier et al. | |
| 2016/0188990 A1* | 6/2016 | Hosabettu | G06V 30/1902 |
| | | | 382/177 |
| 2016/0239911 A1 | 8/2016 | Wang et al. | |
| 2016/0307071 A1 | 10/2016 | Perronnin et al. | |
| 2017/0186174 A1* | 6/2017 | George | G06T 7/12 |

OTHER PUBLICATIONS

Zuo et al., "An Intelligent Knowledge Extraction Framework for Recognizing Identification Information from Real-World ID Card Images", IEEE Access, 2019, vol. 7, pp. 165448-165457.

\* cited by examiner

```
Card Dimension- 8.5 cm and 5.3 cm

Portrait Mode - ☐
Landscape Mode - ■

Location of card number – 2.5 cm
Location of expiry date – 3.2 cm and center
Location of Card Holder Name – Bottom Left
Language-      ■ English , Others _____

Microchip-     ■ Yes       ☐ No
Location of the microchip-     ■ Left      ☐ Right Logo- ■ Yes    ☐ No
Location of the Logo-   ■ Bottom   ☐ Top
```

FIGURE 4D

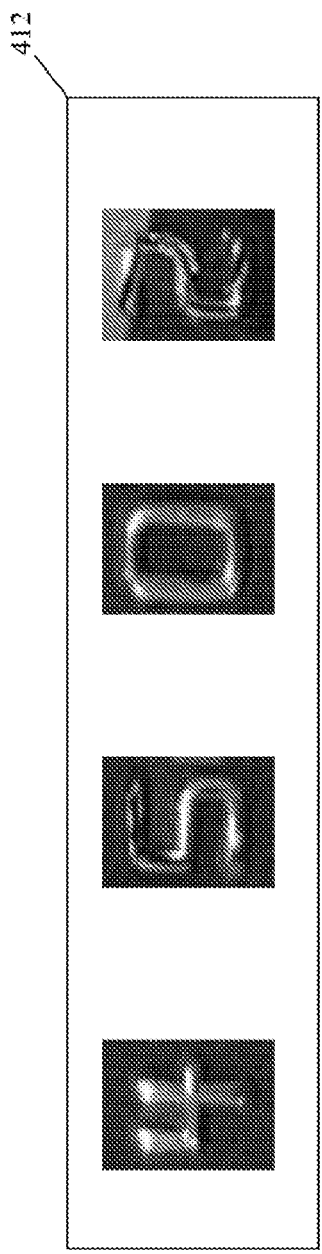

SYSTEM AND COMPUTER-IMPLEMENTED METHOD FOR CHARACTER RECOGNITION IN PAYMENT CARD

CROSS-REFERENCE TO RELATED APPLICATION

This application is the United States national phase of International Application No. PCT/US2020/013783 filed Jan. 16, 2020, the entire disclosure of which is hereby incorporated by reference in its entirety.

BACKGROUND

1. Technical Field

The present disclosure relates to image processing. Particularly, but not exclusively, the present disclosure relates to a system and method for character recognition from an image of a payment card.

2. Technical Considerations

Recent trends indicate that there is a drastic increase in mobile application based online payments in an e-commerce market using smartphones. For online payments, users need to manually enter payment information including card details, expiry date, name, and the like in each mobile application. An automated character recognition technique is needed to recognize the characters from an image of a payment card, convert the recognized character into digital data, and autofill the payment information in the mobile application. Traditional optical character recognition (OCR) is an automatic character recognition technique that converts text in images into digital data. However, OCR is not suitable for the recognition of embossed text in the image. The OCR has a very low recognition rate for images captured under poor lighting conditions or images with low contrast.

Further, the payment cards with embossed card numbers, unlike printed card numbers, are difficult to distinguish from the background of the payment card. Many payment cards include decorated images/patterns in the background, making it difficult to identify the characters from the image of the payment card. Identification is even more difficult when attempting to recognize the character if gold or silver foil on the embossed card numbers is peeled off. Furthermore, light reflection from the surface of the payment cards and different standard fonts used by different payment card issuers further reduce the accuracy of character recognition.

The information disclosed in this background of the disclosure section is only for enhancement of understanding of the general background of the disclosure and should not be taken as an acknowledgment or any form of suggestion that this information forms existing information already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method comprising: receiving, by a computing unit, an image of a payment card and one or more details associated with the payment card, wherein the payment card comprises a plurality of characters; determining, by the computing unit, a derivative of the image based on the one or more details; determining, by the computing unit, a horizontal sum of pixel values for a plurality of rows in the image based on the derivative of the image; identifying, by the computing unit, one or more Regions of Interest (ROIs) in the image by comparing the horizontal sum of pixel values with a predefined first threshold; extracting, by the computing unit, one or more characters from the plurality of characters in the one or more ROIs using one or more peak values in a histogram of the one or more ROIs; and recognizing, by the computing unit, each of the one or more characters extracted from the one or more ROIs using a trained Artificial Intelligence (AI) technique, wherein the recognized one or more characters are provided to one or more applications for performing one or more actions.

In some non-limiting embodiments or aspects, the one or more details comprise at least one of a dimension of the payment card, a spatial location of the one or more ROIs, a presence and a spatial location of a microchip, and a presence and a spatial location of a logo. In some non-limiting embodiments or aspects, determining the derivative of the image comprises computing a convolution of pixel values in the image with filter values of a kernel. In some non-limiting embodiments or aspects, the horizontal sum of pixel values is determined by adding pixel values of one or more rows among the plurality of rows in the image. In some non-limiting embodiments or aspects, the horizontal sum of pixel values is computed for the one or more rows among the plurality of rows in the image from a top portion of the image through a bottom portion of the image. In some non-limiting embodiments or aspects, the horizontal sum of pixel values greater than the predefined first threshold indicates a presence of one or more characters in one or more rows, and the horizontal sum of pixel values less than the predefined first threshold indicates an absence of one or more characters in one or more rows. In some non-limiting embodiments or aspects, each of the one or more ROIs comprises one or more rows of the image among the plurality of rows, wherein the one or more rows comprise the one or more characters.

In some non-limiting embodiments or aspects, extracting the one or more characters comprises: selecting the one or more peak values in the histogram in a descending order based on a magnitude of the one or more peak values; determining a vertical sum of pixel values adjacent to the selected one or more peak values and comparing with a predefined second threshold; and aggregating one or more columns adjacent to a column of the selected one or more peak values based on the comparison with the predefined second threshold. In some non-limiting embodiments or aspects, the vertical sum of pixel values is determined by adding, within the one or more ROIs, the pixel values in the one or more columns adjacent to a column of the selected one or more peak values in the image. In some non-limiting embodiments or aspects, the trained AI technique is a trained convolutional neural network-based deep learning algorithm. In some non-limiting embodiments or aspects, training the AI technique comprises: providing a plurality of characters as input to the AI technique, wherein a desired output of the AI technique for the plurality of characters is known; comparing output of the AI technique with the desired output; and adapting one or more parameters of the AI technique using a supervised learning technique based on the comparison.

In some non-limiting embodiments or aspects, provided is a computing unit for character recognition comprising: a processor; and a memory communicatively coupled to the processor, wherein the memory stores processor instructions, which, on execution, causes the processor to: receive an image of a payment card and one or more details associated with the payment card, wherein the payment card comprises a plurality of characters; determine a derivative of the image based on the one or more details; determine a horizontal sum of pixel values for a plurality of rows in the image based on the derivative of the image; identify one or more Regions of Interest (ROIs) in the image by comparing the horizontal sum of pixel values with a predefined first threshold; extract one or more characters from the plurality of characters in the one or more ROIs using one or more peak values in a histogram of the one or more ROIs; and recognize each of the one or more characters extracted from the one or more ROIs using a trained Artificial Intelligence (AI) technique, wherein the recognized one or more characters are provided to one or more applications for performing one or more actions.

In some non-limiting embodiments or aspects, the processor is configured to receive the one or more details comprising at least one of a dimension of the payment card, a spatial location of the one or more ROIs, a presence and a spatial location of a microchip, and a presence and a spatial location of a logo. In some non-limiting embodiments or aspects, the processor is configured to determine the derivative of the image by computing a convolution of pixel values in the image with filter values of a kernel. In some non-limiting embodiments or aspects, the processor is configured to determine the horizontal sum of pixel values by adding pixel values of one or more rows among the plurality of rows in the image. In some non-limiting embodiments or aspects, the processor is configured to compute the horizontal sum of pixel values for one or more rows among the plurality of rows in the image from a top portion of the image through a bottom portion of the image. In some non-limiting embodiments or aspects, the processor is configured to determine a presence of one or more characters in one or more rows when the horizontal sum of pixel values is greater than the predefined first threshold and determine an absence of one or more characters in one or more rows when the horizontal sum of pixel values is lesser than the predefined first threshold.

In some non-limiting embodiments or aspects, the processor is configured to extract the one or more characters by: selecting the one or more peak values in the histogram in a descending order based on magnitude of the one or more peak values; determining a vertical sum of pixel values adjacent to the selected one or more peak values and comparing with a predefined second threshold; and aggregating one or more columns adjacent to a column of the selected one or more peak values based on the comparison with the predefined second threshold. In some non-limiting embodiments or aspects, the processor is configured to determine the vertical sum of pixel values by adding, within the one or more ROIs, pixel values of the one or more columns adjacent to a column of the selected one or more peak values in the image. In some non-limiting embodiments or aspects, the processor is configured to train the AI technique by: providing a plurality of characters as input to the AI technique, wherein a desired output of the AI technique for the plurality of characters is known; comparing output of the AI technique with the desired output; and adapting one or more parameters of the AI technique using a supervised learning technique based on the comparison.

Further non-limiting embodiments or aspects are set forth in the following numbered clauses.

Clause 1: A computer-implemented method comprising: receiving, by a computing unit, an image of a payment card and one or more details associated with the payment card, wherein the payment card comprises a plurality of characters; determining, by the computing unit, a derivative of the image based on the one or more details; determining, by the computing unit, a horizontal sum of pixel values for a plurality of rows in the image based on the derivative of the image; identifying, by the computing unit, one or more Regions of Interest (ROIs) in the image by comparing the horizontal sum of pixel values with a predefined first threshold; extracting, by the computing unit, one or more characters from the plurality of characters, in the one or more ROIs using one or more peak values in a histogram of the one or more ROIs; and recognizing, by the computing unit, each of the one or more characters extracted from the one or more ROIs using a trained Artificial Intelligence (AI) technique, wherein the recognized one or more characters are provided to one or more applications for performing one or more actions.

Clause 2: The method of clause 1, wherein the one or more details comprise at least one of a dimension of the payment card, a spatial location of the one or more ROIs, a presence and a spatial location of a microchip, and a presence and a spatial location of a logo.

Clause 3: The method of clause 1 or 2, wherein determining the derivative of the image comprises computing a convolution of pixel values in the image with filter values of a kernel.

Clause 4: The method of any of clauses 1-3, wherein the horizontal sum of pixel values is determined by adding pixel values of one or more rows among the plurality of rows in the image.

Clause 5: The method of any of clauses 1-4, wherein the horizontal sum of pixel values is computed for the one or more rows among the plurality of rows in the image from a top portion of the image through a bottom portion of the image.

Clause 6: The method of any of clauses 1-5, wherein the horizontal sum of pixel values greater than the predefined first threshold indicates a presence of one or more characters in one or more rows, and the horizontal sum of pixel values less than the predefined first threshold indicates an absence of one or more characters in one or more rows.

Clause 7: The method of any of clauses 1-6, wherein each of the one or more ROIs comprises one or more rows of the image among the plurality of rows, wherein the one or more rows comprise the one or more characters.

Clause 8: The method of any of clauses 1-7, wherein extracting the one or more characters comprises: selecting the one or more peak values in the histogram in a descending order based on a magnitude of the one or more peak values; determining a vertical sum of pixel values adjacent to the selected one or more peak values and comparing with a predefined second threshold; and aggregating one or more columns adjacent to a column of the selected one or more peak values based on the comparison with the predefined second threshold.

Clause 9: The method of any of clauses 1-8, wherein the vertical sum of pixel values is determined by adding, within the one or more ROIs, the pixel values in the one or more columns adjacent to a column of the selected one or more peak values in the image.

Clause 10: The method of any of clauses 1-9, wherein the trained AI technique is a trained convolutional neural network-based deep learning algorithm.

Clause 11: The method of any of clauses 1-10, wherein training the AI technique comprises: providing a plurality of characters as input to the AI technique, wherein a desired output of the AI technique for the plurality of characters is known; comparing output of the AI technique with the desired output; and adapting one or more parameters of the AI technique using a supervised learning technique based on the comparison.

Clause 12: A computing unit for character recognition comprising: a processor; and a memory communicatively coupled to the processor, wherein the memory stores processor instructions, which, on execution, causes the processor to: receive an image of a payment card and one or more details associated with the payment card, wherein the payment card comprises a plurality of characters; determine a derivative of the image based on the one or more details; determine a horizontal sum of pixel values for a plurality of rows in the image based on the derivative of the image; identify one or more Regions of Interest (ROIs) in the image by comparing the horizontal sum of pixel values with a predefined first threshold; extract one or more characters from the plurality of characters, in the one or more ROIs using one or more peak values in a histogram of the one or more ROIs; and recognize each of the one or more characters extracted from the one or more ROIs using a trained Artificial Intelligence (AI) technique, wherein the recognized one or more characters are provided to one or more applications for performing one or more actions.

Clause 13: The computing unit of clause 12, wherein the processor is configured to receive the one or more details comprising at least one of a dimension of the payment card, a spatial location of the one or more ROIs, a presence and a spatial location of a microchip, and a presence and a spatial location of a logo.

Clause 14: The computing unit of clause 12 or 13, wherein the processor is configured to determine the derivative of the image by computing a convolution of pixel values in the image with filter values of a kernel.

Clause 15: The computing unit of any of clauses 12-14, wherein the processor is configured to determine the horizontal sum of pixel values by adding pixel values of one or more rows among the plurality of rows in the image.

Clause 16: The computing unit of any of clauses 12-15, wherein the processor is configured to compute the horizontal sum of pixel values for one or more rows among the plurality of rows in the image from a top portion of the image through a bottom portion of the image.

Clause 17: The computing unit of any of clauses 12-16, wherein the processor is configured to determine a presence of one or more characters in one or more rows when the horizontal sum of pixel values is greater than the predefined first threshold and determine an absence of one or more characters in one or more rows when the horizontal sum of pixel values is lesser than the predefined first threshold.

Clause 18: The computing unit of any of clauses 12-17, wherein the processor is configured to extract the one or more characters by: selecting the one or more peak values in the histogram in a descending order based on a magnitude of the one or more peak values; determining a vertical sum of pixel values adjacent to the selected one or more peak values and comparing with a predefined second threshold; and aggregating one or more columns adjacent to a column of the selected one or more peak values based on the comparison with the predefined second threshold.

Clause 19: The computing unit of any of clauses 12-18, wherein the processor is configured to determine the vertical sum of pixel values by adding, within the one or more ROIs, pixel values of the one or more columns adjacent to a column of the selected one or more peak values in the image.

Clause 20: The computing unit of any of clauses 12-19, wherein the processor is configured to train the AI technique by: providing a plurality of characters as input to the AI technique, wherein a desired output of the AI technique for the plurality of characters is known; comparing output of the AI technique with the desired output; and adapting one or more parameters of the AI technique using a supervised learning technique based on the comparison.

Disclosed herein is a computer-implemented method for character recognition in a payment card. The method includes receiving an image of a payment card and one or more details associated with the payment card, where the payment card comprises a plurality of characters. Further, the method includes determining a derivative of the image based on the one or more details. Furthermore, the method includes determining a horizontal sum of pixel values for a plurality of rows in the image based on the derivative of the image. Subsequently, the method includes identifying one or more Regions of Interest (ROIs) in the image by comparing the horizontal sum of pixel values with a predefined first threshold. Thereafter, the method includes extracting one or more characters from the plurality of characters in the one or more ROIs using one or more peak values in a histogram of the one or more ROIs. Finally, the method includes recognizing each of the one or more characters extracted from the one or more ROIs using a trained Artificial Intelligence (AI) technique, where the recognized one or more characters are provided to one or more applications for performing one or more actions.

Further, in some non-limiting embodiments or aspects, the present disclosure may include a computing unit for character recognition. The computing unit includes a processor and a memory communicatively coupled to the processor, where the memory stores the processor executable instructions, which, on execution, causes the processor to receive an image of a payment card and one or more details associated with the payment card, where the payment card comprises a plurality of characters. Further, the processor is configured to determine a derivative of the image based on the one or more details. Furthermore, the processor is configured to determine a horizontal sum of pixel values for a plurality of rows in the image based on the derivative of the image. Subsequently, the processor is configured to identify one or more Regions of Interest (ROIs) in the image by comparing the horizontal sum of pixel values with a predefined first threshold. Thereafter, the processor is configured to extract one or more characters from the plurality of characters in the one or more ROIs using one or more peak values in a histogram of the one or more ROIs. Finally, the processor is configured to recognize each of the one or more characters extracted from the one or more ROIs using a trained Artificial Intelligence (AI) technique, where the recognized one or more characters are provided to one or more applications for performing one or more actions.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4D is an exemplary convolution of a first matrix with a second matrix, in accordance with some non-limiting embodiments or aspects of the present disclosure;

FIG. 4H is extracted one or more characters from an image of the exemplary payment card, in accordance with some non-limiting embodiments or aspects of the present disclosure;

Figure 1:
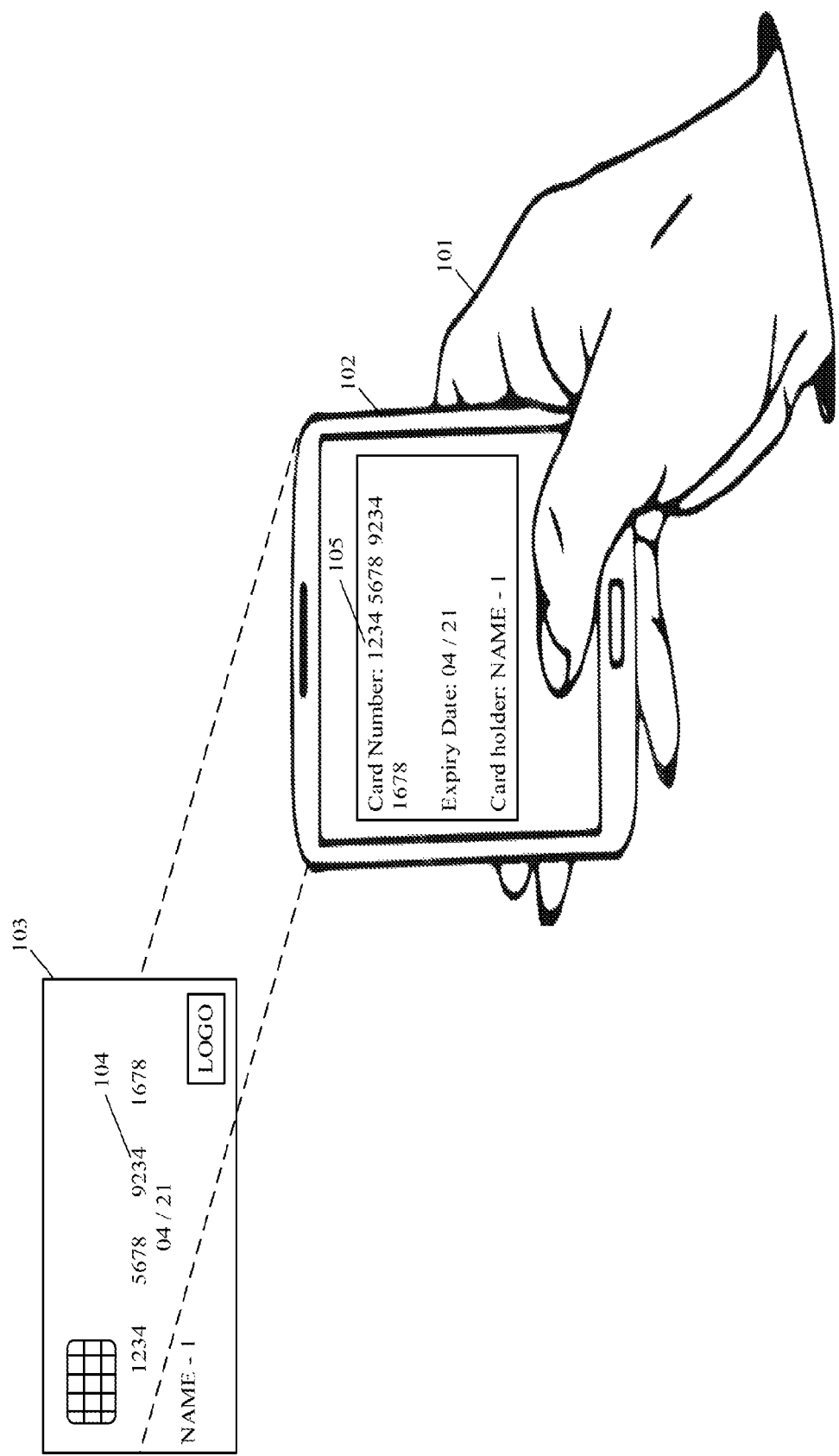
FIG. 1 is an exemplary environment for character recognition from an image of a payment card, in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer-readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but is not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a system and computer-implemented method for character recognition in a payment card. In some non-limiting embodiments or aspects, the method includes receiving an image of a payment card and one or more details associated with the payment card, where the payment card comprises a plurality of characters. Further, the method includes determining a derivative of the image based on the one or more details. Furthermore, the method includes determining a horizontal sum of pixel values for a plurality of rows in the image based on the derivative of the image. Subsequently, the method includes identifying one or more Regions of Interest (ROIs) in the image by comparing the horizontal sum of pixel values with a predefined first threshold. Thereafter, the method includes extracting one or more characters from the plurality of characters in the one or more ROIs using one or more peak values in a histogram of the one or more ROIs. Finally, the method includes recognizing each of the one or more characters extracted from the one or more ROIs using a trained Artificial Intelligence (AI) technique, wherein the recognized one or more characters are provided to one or more applications for performing one or more actions.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for character recognition from an image of a payment card, in accordance with some non-limiting embodiments or aspects of the present disclosure. In some implementations, a user (101) may use a device (102) including an image sensor (for example, a color camera, an infrared camera, and the like) for capturing the image (not shown in the figure) of a payment card (103). For example, the device (102) is a smartphone or a tablet computer including a user interface, one or more applications for performing one or more actions, and the like. The payment card (103) includes a plurality of characters (104). A computing unit (not shown in the figure) may be used to process the image of the payment card (103) for recognizing the plurality of characters (104) in the image. In some non-limiting embodiments or aspects, the computing unit may be housed inside the device (102). In some non-limiting embodiments or aspects, the computing unit may be housed on a server communicatively connected to the device (102) via a communication network (not shown in the figure). Further, the communication network may include, for example, a direct interconnection, e-commerce network, a peer to peer (P2P) network, local area network (LAN), wide area network (WAN), wireless network (e.g., using Wireless Application Protocol), the Internet, Wi-Fi®, cellular network, and the like.

In some non-limiting embodiments or aspects, the computing unit receives the image of the payment card (103) captured using the image sensor of the device (102). Further, the computing unit may receive one or more details associated with the payment card (103). For example, the one or more details may be the dimensions of the payment card (103), the spatial location of the card number, name of the card holder, expiry date, and the like. The user (101) may provide the one or more details using the user interface housed on the device (102).

In some non-limiting embodiments or aspects, the computing unit determines a derivative of the image based on the one or more details. For example, if the image of the payment card (103) is captured in a portrait mode, the computing unit may rotate the image into landscape mode and determine the derivative of the image. The image of the payment card (103) is represented as a first matrix with a plurality of rows and a plurality of columns. Rows and columns in the first matrix are indicative of resolution of the image. One or more values in the first matrix are the pixel values of the image. Further, the derivative of the image is determined by computing a convolution of pixel values in the image with filter values of a kernel. The kernel is represented as a second matrix and stored in the computing unit. The one or more values in the second matrix are the filter values of the kernel. The convolution of the kernel with the image is a mathematical operation generating a third matrix denoted as the derivative of the image.

In some non-limiting embodiments or aspects, the computing unit determines a horizontal sum of pixel values for a plurality of rows in the image based on the derivative of the image. The horizontal sum includes aggregating or adding the pixel values as each row of the third matrix. The computing unit compares the horizontal sum of pixel values of each row in the third matrix with a predefined first threshold. Further, the computing unit identifies one or more ROIs in the image by selecting the one or more rows having the horizontal sum greater than the predefined first threshold. For example, the predefined first threshold may be 65. The one or more ROIs are indicative of presence of one or more characters among the plurality of characters (104) in the payment card (103).

In some non-limiting embodiments or aspects, the computing unit determines a histogram for each of the one or more ROIs in the image. The histogram is an accurate representation of the distribution of numerical data based on the frequency of occurrence of the pixel values. The computing unit extracts the one or more characters in the one or more ROIs using one or more peak values in a histogram of the one or more ROIs. The one or more peaks in the histogram correspond to the one or more characters in the one or more ROIs. Further, the computing unit recognizes each of the one or more characters extracted from the one or more ROIs using a trained AI technique.

In some non-limiting embodiments or aspects, the trained AI technique may include at least one of a deep learning model-based convolution neural network, Long-Short Term Memory (LSTM), and the like. The AI technique is trained by adapting one or more parameters of the AI technique using a supervised learning technique. The computing unit provides the recognized one or more characters (105) to one or more applications in the device (102). The one or more applications may perform one or more actions using the recognized one or more characters (105). For example, the one or more applications may include at least one of a payment application, e-commerce application, and the like. The one or more actions performed by the one or more applications may include at least one of initiating a payment transaction, displaying the recognized one or more characters (105) to the user (101) using the user interface of the device (102) as shown in FIG. 1, autofill a payment information using the recognized one or more characters (105), and the like.

Figure 2:
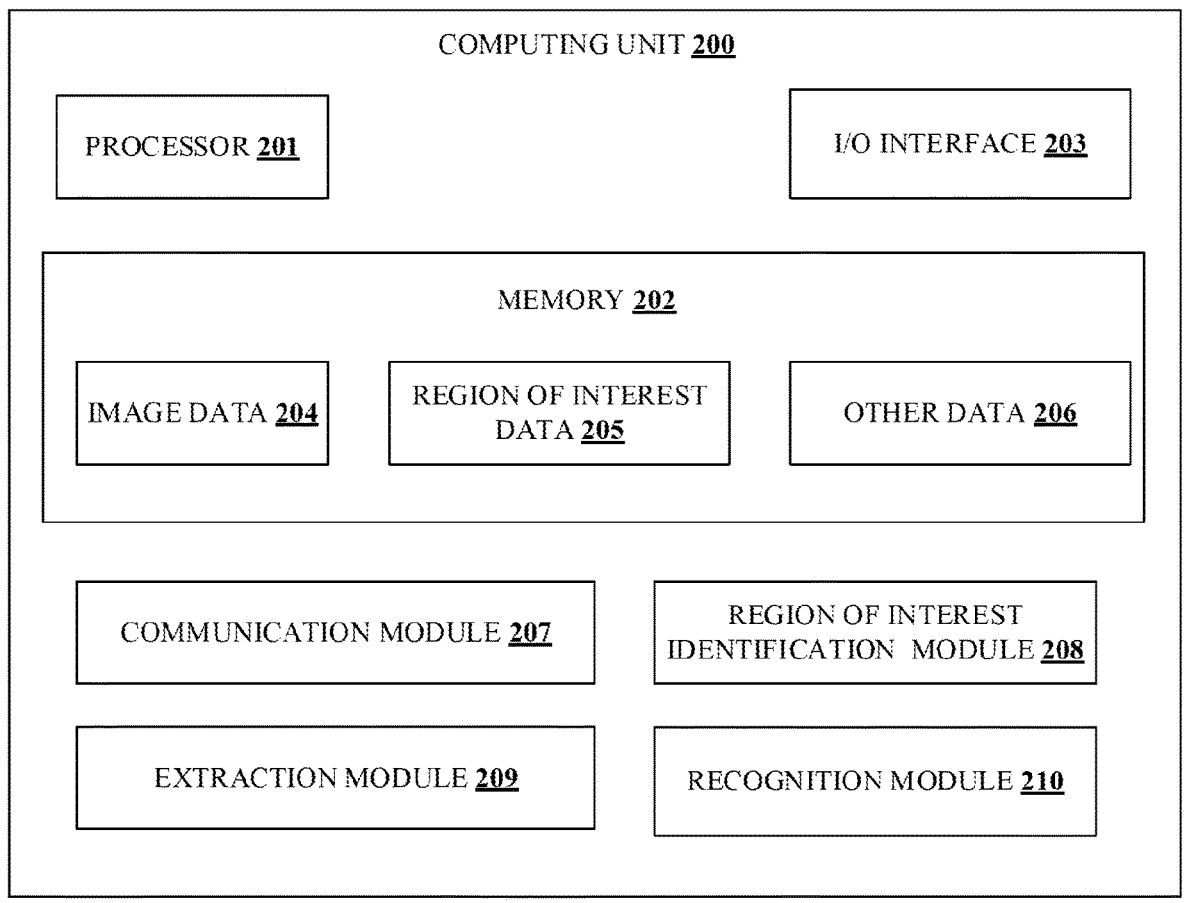
FIG. 2 is a simplified block diagram of a computing unit for character recognition from an image of a payment card, in accordance with some non-limiting embodiments or aspects of the present disclosure.

FIG. 2 shows a simplified block diagram of a computing unit (200) for character recognition from an image of a payment card (103), in accordance with some non-limiting embodiments or aspects of the present disclosure. In some non-limiting embodiments or aspects, the computing unit (200) may include at least one Central Processing Unit ("CPU" or "processor") (201) and a memory (202) storing instructions executable by the at least one processor (201). The processor (201) may comprise at least one data processor for executing program components for executing user or system-generated requests. The memory (202) is communicatively coupled to the processor (201). The computing unit (200) further comprises an Input/Output (I/O) interface (203). The I/O interface (203) is coupled with the processor (201) through which an input signal or/and an output signal is communicated. In some non-limiting embodiments or aspects, the data stored in the memory (202) may include image data (204), ROI data (205), and other data (206).

In some non-limiting embodiments or aspects, the image data (204) may include at least one of image of the payment card (103) captured by the device (102), derivative of the image, one or more details associated with the payment card (103), filter values of the kernel, and the like. The image of the payment card (103), the derivative of the image, and the filter values of the kernel are represented in the form of a matrix. The one or more details include at least one of a dimension of the payment card (103), a spatial location of the one or more ROIs, a presence and a spatial location of a microchip, a presence and a spatial location of a logo, and the like. For example, the one or more details may be (10 cm×5 cm) indicating the dimension of the payment card (103) and the microchip at right top corner of the payment card (103).

In some non-limiting embodiments or aspects, the ROIs data (205) may include at least one of the horizontal sum of pixel values, a predefined first threshold, one or more rows of the first matrix indicating the one or more ROIs in the image of the payment card (103), and the like. In some non-limiting embodiments or aspects, other data (206) may include at least one of recognized one or more characters (105), one or more parameters (for example, number of neurons, kernel values for each neuron, connections between the neuron, and the like) associated with the trained AI technique, and the like. In some non-limiting embodiments or aspects, a communication module (207) is configured to receive an image of the payment card (103) from the image sensor associated with the device (102). Further, the recognized one or more characters (105) are provided to the one or more applications in the device (102). For example, the one or more applications may be a payment application, an e-commerce application, and the like.

In some non-limiting embodiments or aspects, a ROI identification module (208) is configured to determine the derivative of the image of the payment card (103). The derivative of the image may be indicative of a directional change of the intensity values in the image. The derivative of the image is determined by performing convolution of the first matrix with a second matrix. The first matrix is indicative of pixel values of the image and the second matrix is indicative of filter values of the kernel. The pixel values and the filter values are stored in the image data (204). The ROI identification module (208) is configured to compute the horizontal sum of pixel values of plurality of rows in the third matrix. The third matrix is indicative of derivative of the image of the payment card (103). Further, the ROI identification module (208) is configured to compare the horizontal sum of each row among the plurality of rows in the third matrix with the predefined first threshold. The ROI identification module (208) selects the one or more rows with the horizontal sum greater than the predefined first threshold. The selected one or more rows are indicative of presence of one or more characters. The selected one or more rows are identified as one or more ROIs in the image.

In some non-limiting embodiments or aspects, an extraction module (209) is configured to determine the histogram for the one or more ROIs. Based on the position of the peak values in the histogram of the one or more ROIs, the one or more characters are extracted from the image of the payment card (103). For example, a histogram (411) for the one or more ROIs is shown in FIG. 4G. The extracted one or more characters include a plurality of pixel values around the position of the peak values in the image of payment card (103). In some non-limiting embodiments or aspects, a recognition module (210) is configured to recognize each of the one or more characters extracted from the one or more ROIs using a trained AI technique. The recognition module (210) may use a deep learning-based convolution neural network for recognition of the one or more characters.

Figure 3:
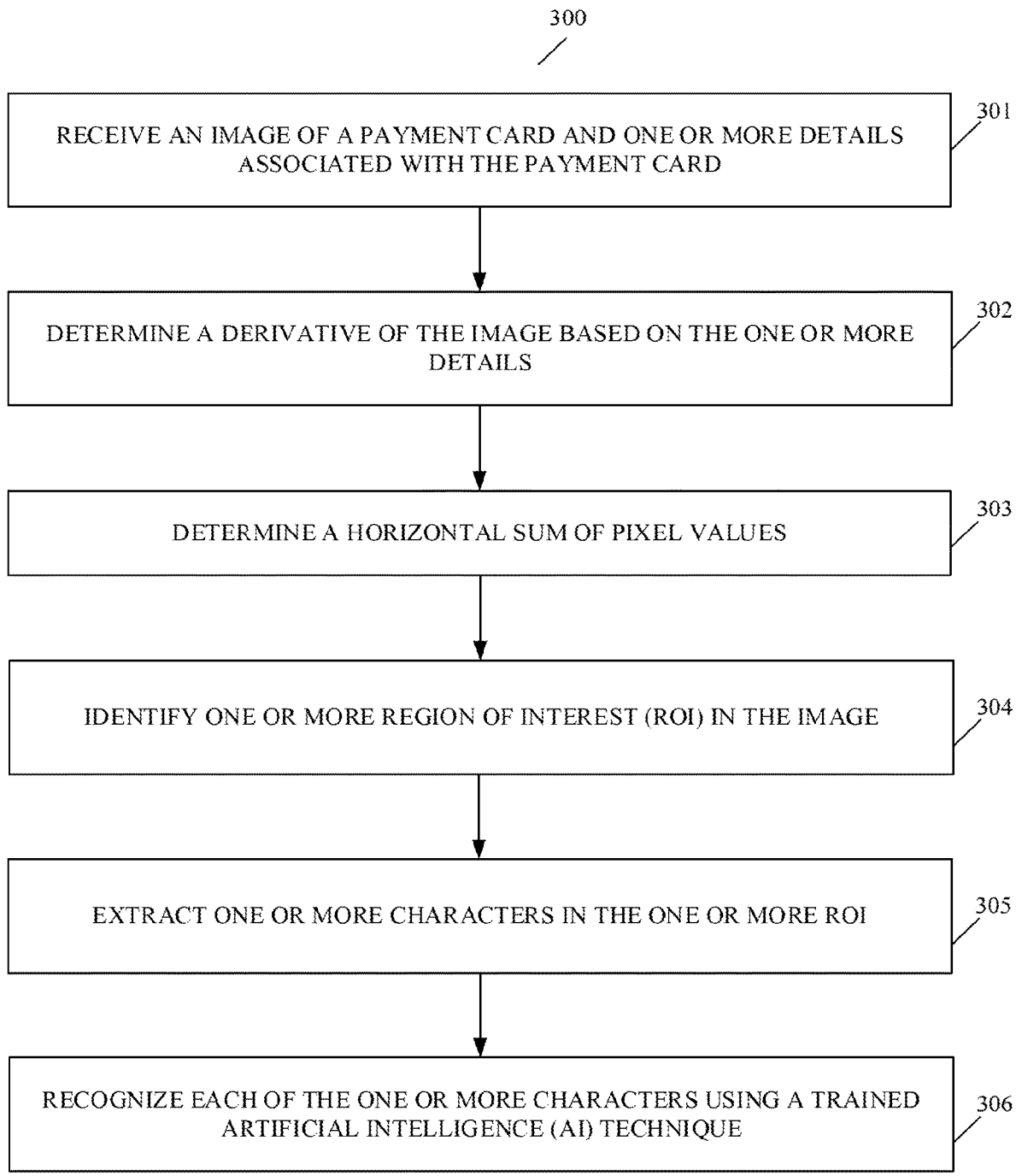
FIG. 3 is a flow chart illustrating method steps for character recognition from an image of a payment card, in accordance with some non-limiting embodiments or aspects of the present disclosure.

FIG. 3 shows a flow chart (300) illustrating method steps for character recognition from the image of the payment card (103), in accordance with some non-limiting embodiments or aspects of the present disclosure. The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At step (301), the computing unit (200) receives the image of the payment card (103) and the one or more details associated with the payment card (103), where the payment card (103) comprises the plurality of characters (104). Further, the one or more details comprise at least one of the dimension of the payment card (103), the spatial location of the one or more ROIs, the presence and the spatial location of the microchip, the presence and the spatial location of a logo, and the like.

Figures 4A, 4B:
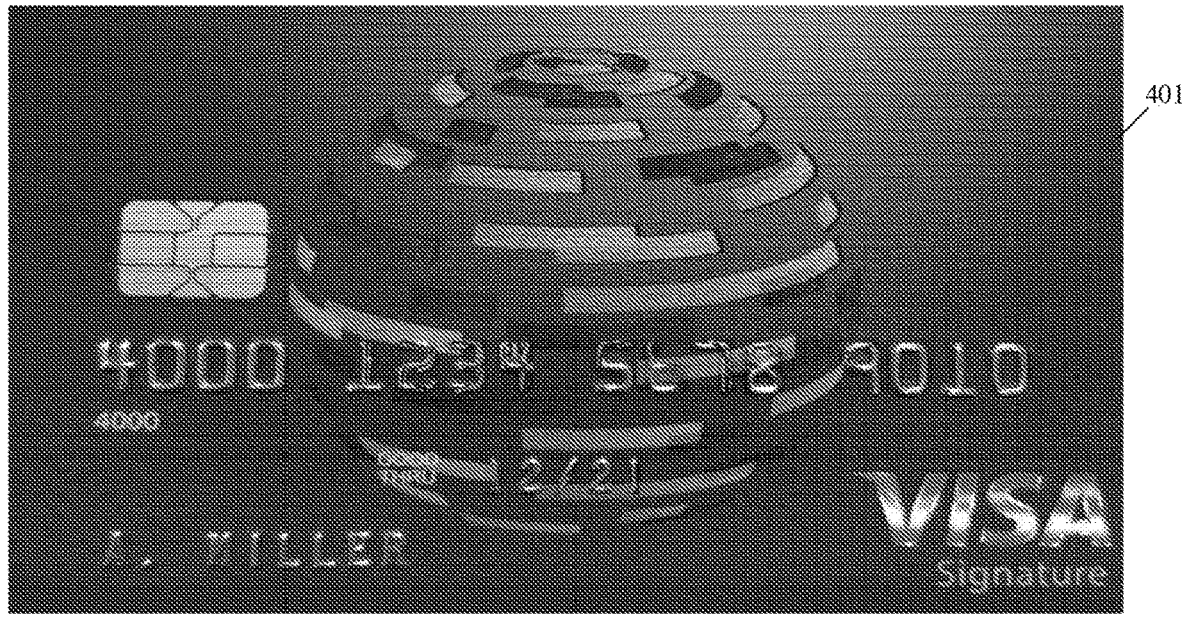
FIG. 4A is an image of an exemplary payment card, in accordance with some non-limiting embodiments or aspects of the present disclosure.
FIG. 4B is an exemplary of one or more details associated with a payment card, in accordance with some non-limiting embodiments or aspects of the present disclosure.

As shown in FIG. 4A, the computing unit (200) receives an image (401) of the payment card (103). In some non-limiting embodiments or aspects, the computing unit (200) may receive a color image or a grayscale image of the payment card (103). The computing unit (200) converts the color image into a grayscale image. Further, the computing unit (200) may perform one or more image preprocessing techniques on the received image (401) of the payment card (103). The one or more image preprocessing techniques may include at least one of a contrast adjustment, sharpening, blurring, and the like. The person skilled in the art may appreciate the use of additional one or more image preprocessing techniques (for example, flip, straighten, red-eye reduction, mirror, normalization, and the like) and the one or more image preprocessing techniques detailed above should not be treated as a limitation.

In some non-limiting embodiments or aspects, the computing unit (200) receives from the user (101) the one or more details associated with the payment card (103). The user (101) may provide the one or more details to the computing unit (200) using the user interface housed on the device (102). The user (101) may enter the one or more details manually using a physical keypad or a virtual keyboard associated with the device (102) or by selecting the check boxes and the like. As shown in FIG. 4B, one or more details (402) associated with the payment card (103) are received from the user (101). Referring to FIG. 3, at step (302), the computing unit (200) determines the derivative of the image (401) based on the one or more details. The derivative of the image (401) is determined by computing the convolution of the pixel values in the image (401) with the filter values of a kernel.

In some non-limiting embodiments or aspects, the computing unit (200) stores the received image (401) as the first matrix with a plurality of rows and a plurality of columns. The number of rows and the number of columns in the first matrix are indicative of the resolution of the image (401). The one or more values in the first matrix are indicative of the pixel values of the image (401). The kernel is represented as the second matrix with a plurality of rows and a plurality of columns. The number of rows and the number of columns in the second matrix are indicative of the size of the kernel. The one or more values of the second matrix are indicative of the filter values of the kernel. The filter values of the kernel are obtained using at least one of a bilateral filter, a Laplacian, a Sobel, a Roberts, a Prewitt, a Gaussian, a Gabor filter, and the like. A person skilled in the art may appreciate the use of one or more kernels determined using the aspects of image processing and the kernel detailed above should not be treated as a limitation. The derivative of the image (401) is determined using the convolution of the image (401) (e.g., a first matrix) with the kernel (e.g., a second matrix). The convolution between the image (401) and the kernel is determined by adding each of the pixel values of the image (401) with the neighboring pixel values and weighted by the filter values of the kernel. The derivative of the image (401) is computed using the equation below:

$$D = \text{first matrix} * \text{second matrix} \quad (1)$$

where "D" denotes the derivative of the image (401) and "*" denotes the convolution operation.

Figure 4C:
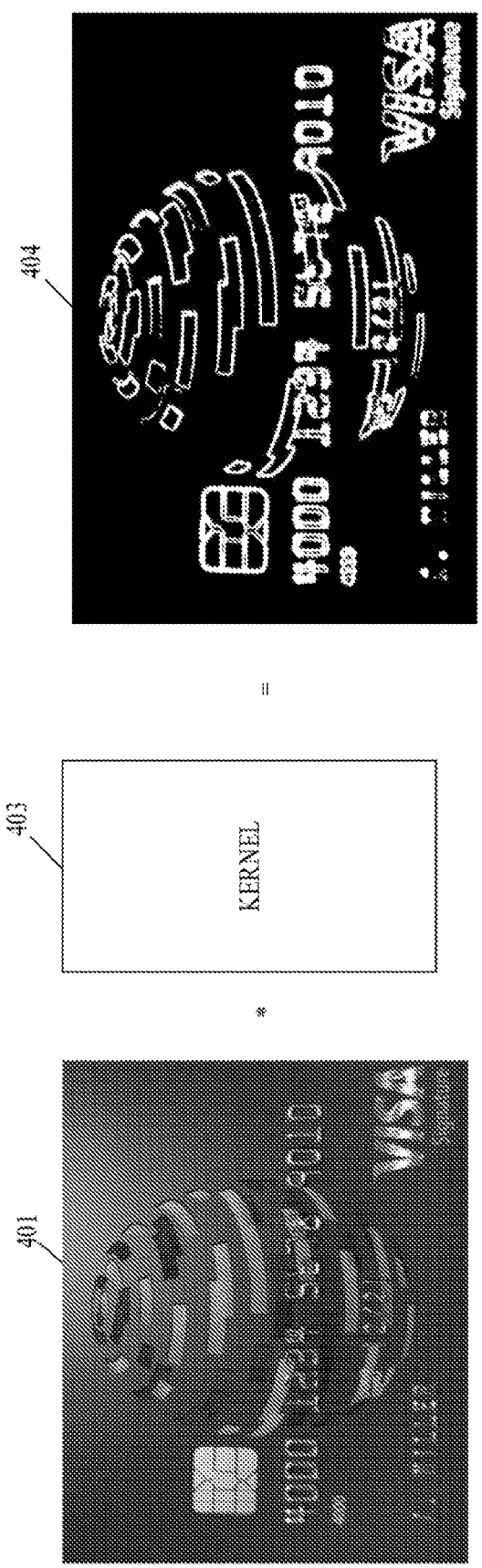
FIG. 4C is an exemplary derivative of an image of a payment card, in accordance with some non-limiting embodiments or aspects of the present disclosure.
Figure 4D:
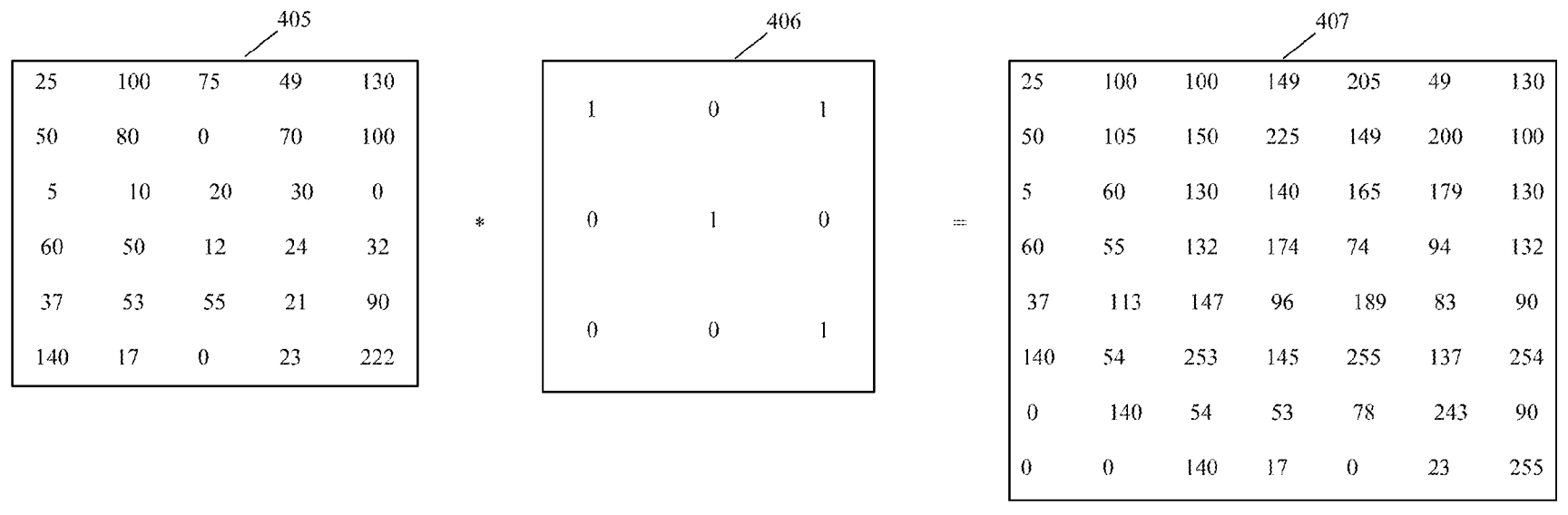

As shown in FIG. 4C, the computing unit (200) convolves the image (401) with a kernel (403) to determine a derivative (404) of the image (401). As shown in FIG. 4D, a portion of the image (401) represented as a first matrix (405) is convolved with the filter values of the kernel (403) represented as a second matrix (406) to determine the derivative (404) of a portion of the image (401) represented as a third matrix (407).

Referring to FIG. 3, at step (303), the computing unit (200) determines the horizontal sum of pixel values for the plurality of rows in the image (401) based on the derivative (404) of the image (401). The horizontal sum of pixel values is determined by adding the pixel values of the one or more rows among the plurality of rows in the image (401). The horizontal sum is computed for the one or more rows among the plurality of rows in the image (401) from the top portion of the image (401) through the bottom portion of the image (401).

Figure 4E:
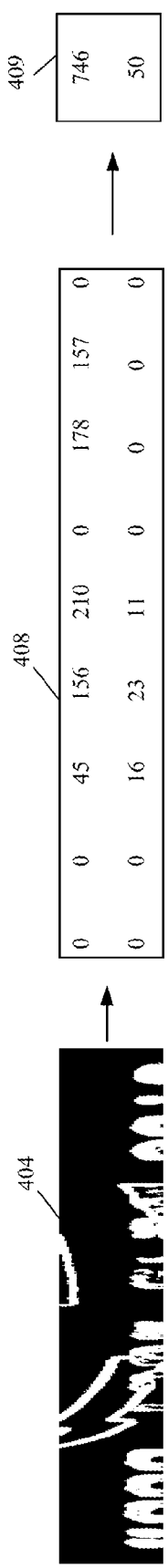
FIG. 4E is an exemplary determination of a horizontal sum of pixel values for one or more rows in a derivative of the image, in accordance with some non-limiting embodiments or aspects of the present disclosure.

A portion of the derivative (404) of the image (401) and the corresponding pixel values of one or more rows (408) among the plurality of rows in the image (401), as shown in FIG. 4E, are used by the computing unit (200) for determining the horizontal sum of pixel values. As shown in FIG. 4E, a horizontal sum of pixel values (409) for the one or more rows (408) is determined by the computing unit (200) by adding the pixel values of the one or more rows (408). In some non-limiting embodiments or aspects, the horizontal sum is determined using the equation given below:

$$H_i = \Sigma_{k=0}^{n} x_k \quad (2)$$

where $H_i$ denotes the horizontal sum of pixel values (409) of the row numbered "i" among the plurality of rows in the derivative (404) of the image (401), "n" denotes the number of pixel of values in the row numbered "i", "$x_k$" denotes a pixel value in the row numbered "i" at a position "k".

At step (304), the computing unit (200) identifies the one or more ROIs in the image (401) by comparing the horizontal sum of pixel values (409) with the predefined first threshold. Further, each of the one or more ROIs includes the one or more rows of the image (401) among the plurality of rows, where the one or more rows include the one or more characters. In some non-limiting embodiments or aspects, the horizontal sum of pixel values (409) of each row of the derivative (404) of the image (401) is compared with the predefined first threshold. The predefined first threshold is determined using a static method or a dynamic method. The static method includes associating the predefined first threshold with a constant value. For example, using the static method, the predefined first threshold may be 65. The dynamic method includes determining the predefined first threshold for each of the derivatives (404) of the image (401) using one or more image processing techniques for example averaging, standard deviation, minimum threshold, and the like. The horizontal sum of pixel values (409) greater than the predefined first threshold is indicative of the presence of one or more characters in the one or more rows (408) and the horizontal sum of pixel values (409) less than the predefined first threshold is indicative of the absence of one or more characters in the one or more rows (408). Further, the computing unit (200) selects the one or more rows from the plurality of rows in the image (401) having the horizontal sum of pixel values (409) greater than the predefined first threshold.

Figure 4F:
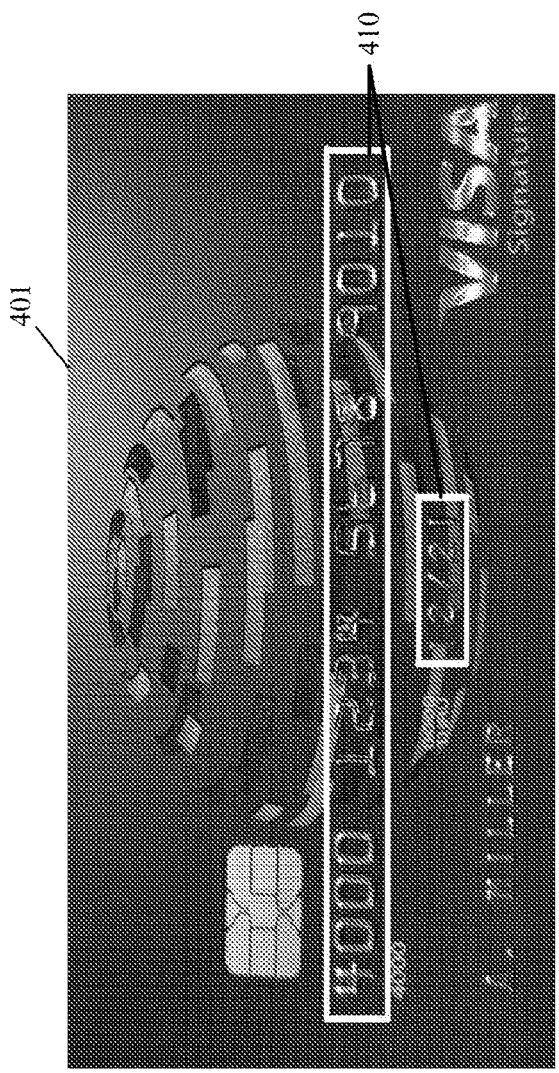
FIG. 4F is one or more Regions of Interest (ROIs) in an image of the exemplary payment card, in accordance with some non-limiting embodiments or aspects of the present disclosure.
Figure 4G:
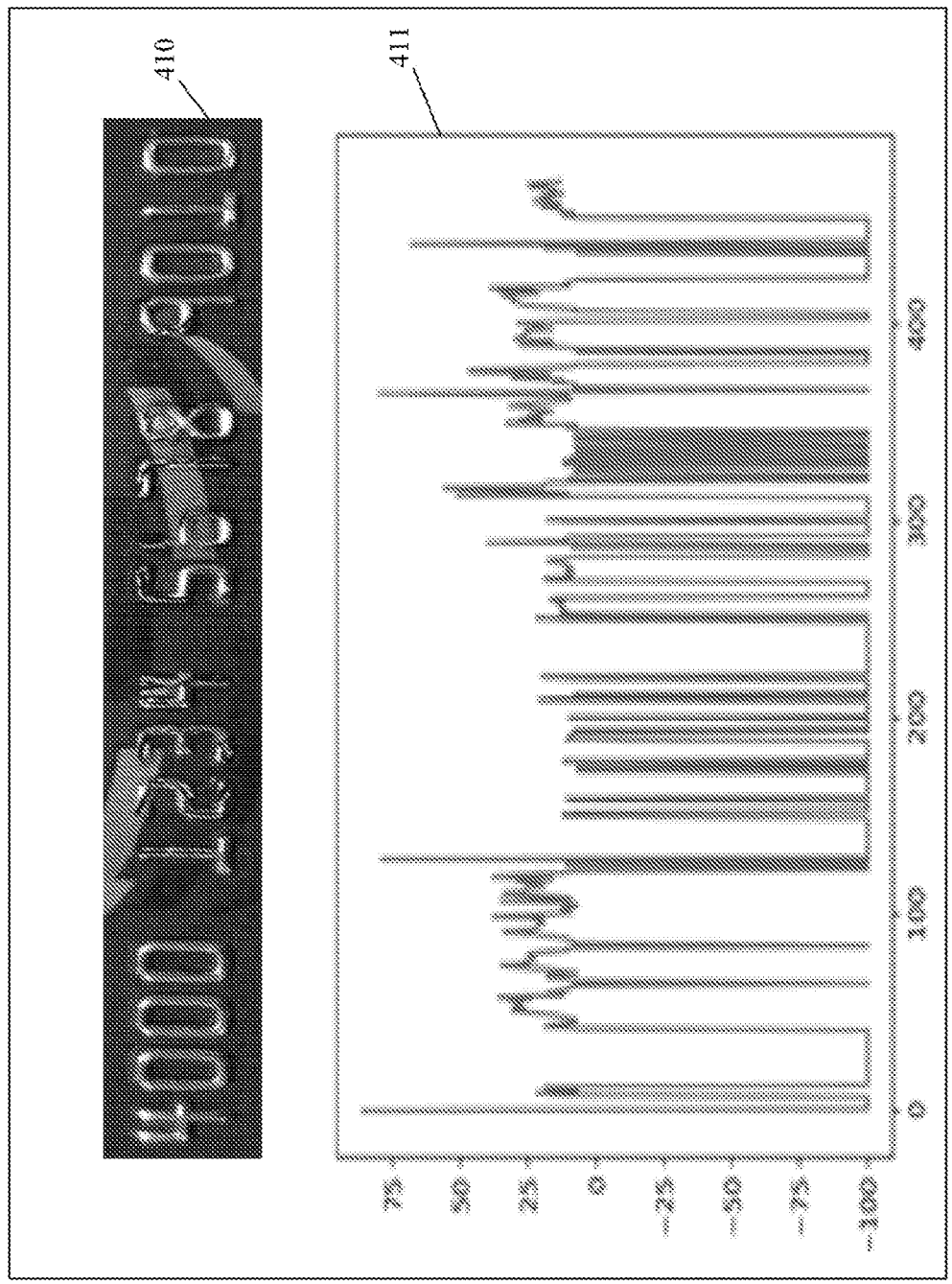
FIG. 4G is a histogram corresponding to one or more Regions of Interest (ROIs) identified in an image of the exemplary payment card, in accordance with some non-limiting embodiments or aspects of the present disclosure.

In some non-limiting embodiments or aspects, the computing unit (200) groups the selected one or more rows into one or more ROIs in the image (401). The selected one or more rows are grouped using the row numbers of the one or more rows in the image (401). For example, let the row numbers of the selected one or more rows be [51,52,53,54,55,67,68,69,70,120,121,122,123], such that the computing unit (200) groups the row numbers 51 to 55 as the first ROI, 67 to 70 as the second ROI, and 120 to 123 as the third ROI. The first ROI may include the one or more characters of the card number, the second ROI may include the one or more characters of the expiry date of the payment card (103), and the third ROI may include the one or more characters of the name of the card holder. As shown in FIG. 4F, the computing unit (200) identifies one or more ROIs (410) by grouping the selected one or more rows of the image (401). Referring to FIG. 3, at step (305), the computing unit (200) extracts the one or more characters from the plurality of characters (104) in the one or more ROIs (410) using the one or more peak values in the histogram of the one or more ROIs (410).

In some non-limiting embodiments or aspects, the computing unit (200) performs filtering (for example, bilateral filtering and the like) on the one or more rows of the one or more ROIs (410). The computing unit (200) determines the histogram for each of the one or more ROIs (410). The histogram for each of the one or more ROIs (410) contains a plot or a graph of a column number versus a vertical sum of the corresponding column number. The vertical sum corresponding to a column among the plurality of columns is computed by adding the pixel values of the one or more rows for the corresponding column. For example, in the exemplary embodiment or aspect of the one or more rows (408) as shown in FIG. 4E, the vertical sum for the third column is determined by adding the pixel values (45 and 16) as 61. As shown in FIG. 4G, the computing unit (200) determines the histogram (411) corresponding to the one or more ROIs (410). The computing unit (200) extracts the one or more characters in each of the one or more ROIs (410) by selecting the one or more peak values in the histogram (411) in a descending order based on a magnitude of the one or more peak values. Further, the computing unit (200) determines a vertical sum of pixel values adjacent to the selected one or more peak values and compares it with a predefined second threshold. The vertical sum is determined by adding within the one or more ROIs (410), the pixel values in the one or more columns adjacent to a column of the selected one or more peak values in the image (401). The predefined second threshold may be set to a static value for example −10, 0, 15, and the like. In some non-limiting embodiments or aspects, the predefined second threshold is determined dynamically using the mean or standard deviation of the pixel values in each of the one or more ROIs (410). Furthermore, the computing unit (200) aggregates one or more columns adjacent to a column of the selected one or more peak values based on the comparison with the predefined second threshold. The vertical sum of the one or more columns adjacent to the column of the selected one or more peak values having a value greater than the predefined second threshold is aggregated until the value of the vertical sum is less than the predefined second threshold. The aggregated one or more columns correspond to the one or more characters (412) extracted from the one or more ROIs (410) as shown in FIG. 4H. Referring to FIG. 3, at step (306), the computing unit (200) recognizes each of the one or more characters (412) extracted from the one or more ROIs (410) using the trained AI technique, where the recognized one or more characters (105) are provided to the one or more applications for performing the one or more actions.

In some non-limiting embodiments or aspects, the trained AI technique is a trained convolution neural network-based deep learning algorithm. The architecture of the convolution neural network may include one or more convolution layers, one or more pooling layers, one or more rectified linear units, one or more fully connected layers, and one or more loss layers including one or more connections between one or more layers. In some non-limiting embodiments or aspects, the computing unit (200) trains the AI technique by providing a plurality of characters as input to the AI technique, wherein a desired output of the AI technique for the plurality of characters is known. Further, the computing unit (200) compares output of the AI technique with the desired output. Furthermore, the computing unit (200) adapts one or more parameters of the AI technique using a supervised learning technique based on the comparison of the output of the AI technique with the desired output. The person skilled in the art may appreciate the use of one or more architectures of the convolution neural network and one or more supervised learning algorithms for training the AI technique to recognize the one or more characters (412).

Figure 4I:
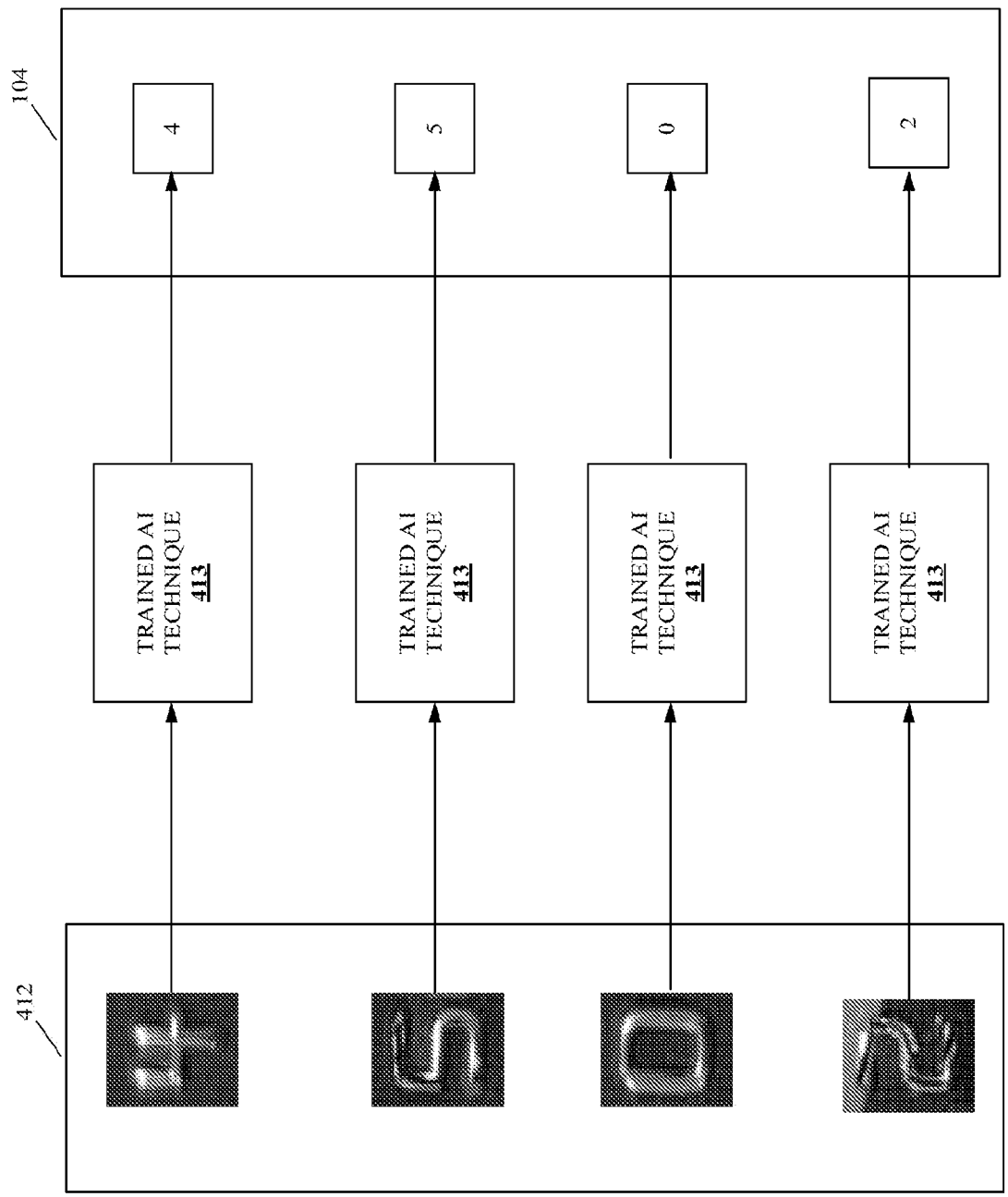
FIG. 4I is a recognized one or more characters using a trained Artificial Intelligence (AI) technique, in accordance with some non-limiting embodiments or aspects of the present disclosure.

In some non-limiting embodiments or aspects, the computing unit (200) provides the one or more characters (412) extracted from the one or more ROIs (410) as an input to a trained AI technique (413). The output of the trained AI technique (413) includes the recognized one or more characters (105) as shown in FIG. 4I. The computing unit (200) provides the recognized one or more characters (105) to the one or more applications for performing the one or more actions. For example, the one or more applications may include at least one of a payment application, e-commerce application, and the like. The one or more actions performed by the one or more applications may include at least one of initiating a payment transaction, displaying the recognized one or more characters (105) to the user (101) using the user interface of the device (102), as shown in FIG. 1, autofill a payment information using the recognized one or more characters (105), and the like.

The method of character recognition in the payment card (103) is used for extracting and recognizing the one or more characters from the plurality of characters (104) in an image (401) of the payment card (103). The character recognition may be performed on one or more types (for example, printed card, embossed card, and the like) of the payment card (103). Further, the character recognition is performed accurately under poor lighting conditions and in images with low contrast and/or brightness. Furthermore, the character recognition is performed accurately in a payment card with decorated images/pattern in the background. The character recognition of the one or more characters in different standard fonts is accurately recognized.

Figure 5:
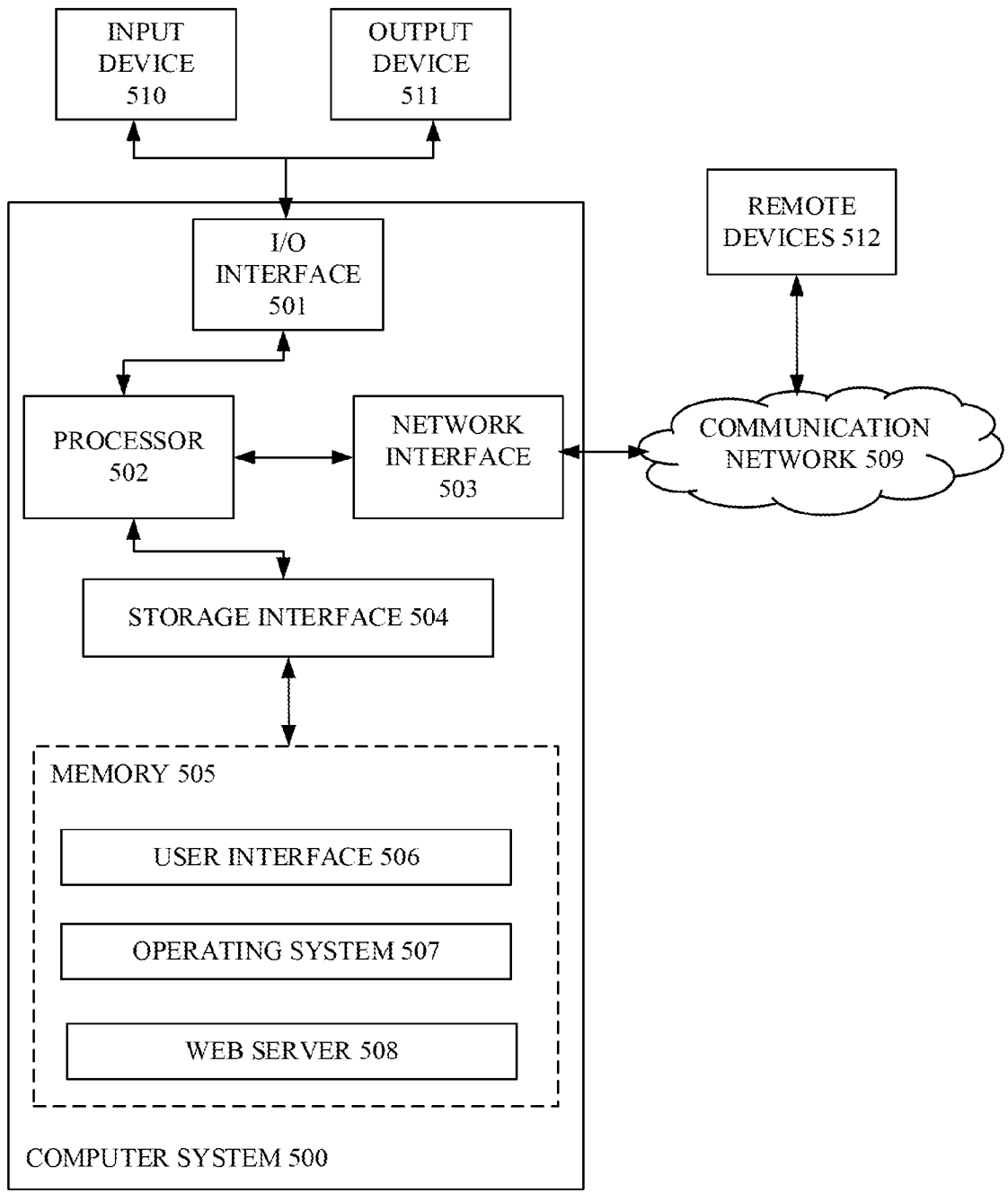
FIG. 5 is an exemplary computer system for character recognition in a payment card, in accordance with some non-limiting embodiments or aspects of the present disclosure.

FIG. 5 illustrates a block diagram of an exemplary computer system (500) for implementing embodiments consistent with the present disclosure. In some non-limiting embodiments or aspects, the computer system (500) may be used to implement the method for character recognition in the image (401) of the payment card (103). The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via an I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

Using the I/O interface (501), the computer system (500) may communicate with one or more I/O devices. For example, an input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some non-limiting embodiments or aspects, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi®, etc. Using the network interface (503) and the communication network (509), the computer system (500) may communicate with the one or more service operators.

In some non-limiting embodiments or aspects, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, a user interface (506), an operating system (507), a web server (508), etc. In some non-limiting embodiments or aspects, the computer system (500) may store user/application data, such as the data, variables, records, etc. as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA® /7/8, 10 etc.), APPLE® IOS®, GOOGLE™ ANDROID™, BLACKBERRY® OS, or the like.

In some non-limiting embodiments or aspects, the computer system (500) may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc. In some non-limiting embodiments or aspects, the computer system (500) may implement a mail server (not shown in the figures) stored program component. The mail server may be an Internet mail server such as Microsoft® Exchange®, or the like. The mail server (not shown in the figures) may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post office Protocol (POP), Simple Mail Transfer Protocol (SMTP), or the like. In some non-limiting embodiments or aspects, the computer system (500) may implement a mail client (not shown in the figures) stored program component. The mail client (not shown in the figures) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some non-limiting embodiments or aspects, computer system (500) may receive at least one of the image (401) of the payment card (103) and one or more details (402) associated with the payment card (103) from remote devices (512) via a communication network (509).

The terms "an embodiment", "embodiment", "embodiments", "the embodiment", "the embodiments", "one or more embodiments", "some non-limiting embodiments or aspects", and "one embodiment" mean "one or more (but not all) embodiments of the disclosure" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
   receiving, by a computing unit, an image of a payment card and one or more details associated with the payment card, wherein the payment card comprises a plurality of characters;
   determining, by the computing unit, a derivative of the image based on the one or more details;
   determining, by the computing unit, a horizontal sum of pixel values for a plurality of rows in the image based on the derivative of the image;
   identifying, by the computing unit, one or more Regions of Interest (ROIs) in the image by comparing the horizontal sum of pixel values with a predefined first threshold;
   extracting, by the computing unit, one or more characters from the plurality of characters, in the one or more ROIs using one or more peak values in a histogram of the one or more ROIs; and
   recognizing, by the computing unit, each of the one or more characters extracted from the one or more ROIs using a trained Artificial Intelligence (AI) technique, wherein the recognized one or more characters are provided to one or more applications for performing one or more actions,
   wherein extracting the one or more characters comprises:
      selecting the one or more peak values in the histogram in a descending order based on a magnitude of the one or more peak values; and
      determining a vertical sum of pixel values adjacent to the selected one or more peak values.

2. The method of claim 1, wherein the one or more details comprise at least one of a dimension of the payment card, a spatial location of the one or more ROIs, a presence and a spatial location of a microchip, and a presence and a spatial location of a logo.

3. The method of claim 1, wherein determining the derivative of the image comprises computing a convolution of pixel values in the image with filter values of a kernel.

4. The method of claim 1, wherein the horizontal sum of pixel values is determined by adding pixel values of one or more rows among the plurality of rows in the image.

5. The method of claim 4, wherein the horizontal sum of pixel values is computed for the one or more rows among the plurality of rows in the image from a top portion of the image through a bottom portion of the image.

6. The method of claim 1, wherein the horizontal sum of pixel values greater than the predefined first threshold indicates a presence of one or more characters of the payment card in one or more rows in the image, and the horizontal sum of pixel values less than the predefined first threshold indicates an absence of one or more characters of the payment card in one or more rows in the image.

7. The method of claim 1, wherein each of the one or more ROIs comprises one or more rows of the image among the plurality of rows, wherein the one or more rows comprise the one or more characters.

8. The method of claim 1, wherein extracting the one or more characters further comprises:
comparing the vertical sum of pixel values adjacent to the selected one or more peak values with a predefined second threshold; and
aggregating one or more columns adjacent to a column of the selected one or more peak values based on the comparison with the predefined second threshold.

9. The method of claim 8, wherein the vertical sum of pixel values is determined by adding, within the one or more ROIs, pixel values in the one or more columns adjacent to the column of the selected one or more peak values in the image.

10. The method of claim 1, wherein the trained AI technique is a trained convolutional neural network-based deep learning algorithm.

11. The method of claim 1, wherein training the AI technique comprises:
providing a second plurality of characters as input to the AI technique, wherein a desired output of the AI technique for the second plurality of characters is known;
comparing output of the AI technique with the desired output; and
adapting one or more parameters of the AI technique using a supervised learning technique based on the comparison.

12. A computing unit for character recognition comprising:
a processor; and
a memory communicatively coupled to the processor, wherein the memory stores processor instructions, which, on execution, causes the processor to:
receive an image of a payment card and one or more details associated with the payment card, wherein the payment card comprises a plurality of characters;
determine a derivative of the image based on the one or more details;
determine a horizontal sum of pixel values for a plurality of rows in the image based on the derivative of the image;
identify one or more Regions of Interest (ROIs) in the image by comparing the horizontal sum of pixel values with a predefined first threshold;
extract one or more characters from the plurality of characters, in the one or more ROIs using one or more peak values in a histogram of the one or more ROIs; and
recognize each of the one or more characters extracted from the one or more ROIs using a trained Artificial Intelligence (AI) technique, wherein the recognized one or more characters are provided to one or more applications for performing one or more actions,
wherein the processor is configured to extract the one or more characters by:
selecting the one or more peak values in the histogram in a descending order based on a magnitude of the one or more peak values; and
determining a vertical sum of pixel values adjacent to the selected one or more peak values.

13. The computing unit of claim 12, wherein the processor is configured to receive the one or more details comprising at least one of a dimension of the payment card, a spatial location of the one or more ROIs, a presence and a spatial location of a microchip, and a presence and a spatial location of a logo.

14. The computing unit of claim 12, wherein the processor is configured to determine the derivative of the image by computing a convolution of pixel values in the image with filter values of a kernel.

15. The computing unit of claim 12, wherein the processor is configured to determine the horizontal sum of pixel values by adding pixel values of one or more rows among the plurality of rows in the image.

16. The computing unit of claim 12, wherein the processor is configured to compute the horizontal sum of pixel values for one or more rows among the plurality of rows in the image from a top portion of the image through a bottom portion of the image.

17. The computing unit of claim 12, wherein the processor is configured to determine a presence of one or more characters of the payment card in one or more rows in the image when the horizontal sum of pixel values is greater than the predefined first threshold and determine an absence of one or more characters of the payment card in one or more rows in the image when the horizontal sum of pixel values is less than the predefined first threshold.

18. The computing unit of claim 12, wherein the processor is further configured to extract the one or more characters by:
comparing the vertical sum of pixel values adjacent to the selected one or more peak values with a predefined second threshold; and
aggregating one or more columns adjacent to a column of the selected one or more peak values based on the comparison with the predefined second threshold.

19. The computing unit of claim 18, wherein the processor is configured to determine the vertical sum of pixel values by adding, within the one or more ROIs, pixel values of the one or more columns adjacent to the column of the selected one or more peak values in the image.

20. The computing unit of claim 12, wherein the processor is configured to train the AI technique by:
providing a second plurality of characters as input to the AI technique, wherein a desired output of the AI technique for the second plurality of characters is known;
comparing output of the AI technique with the desired output; and adapting one or more parameters of the AI technique using a supervised learning technique based on the comparison.

* * * * *